(12) United States Patent
Ishimatsu

(10) Patent No.: US 10,334,140 B2
(45) Date of Patent: Jun. 25, 2019

(54) IMAGE PROCESSING APPARATUS, IMAGE PICKUP APPARATUS, AND IMAGE PROCESSING METHOD

(71) Applicant: CANON KABUSHIKI KAISHA, Tokyo (JP)

(72) Inventor: Rie Ishimatsu, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 15/478,370

(22) Filed: Apr. 4, 2017

(65) Prior Publication Data
US 2017/0295297 A1 Oct. 12, 2017

(30) Foreign Application Priority Data
Apr. 12, 2016 (JP) .................. 2016-079578

(51) Int. Cl.
| | |
|---|---|
| H04N 1/60 | (2006.01) |
| G02B 5/30 | (2006.01) |
| G02B 27/28 | (2006.01) |
| H04N 5/265 | (2006.01) |
| H04N 9/04 | (2006.01) |
| H04N 5/235 | (2006.01) |
| G01J 3/50 | (2006.01) |
| H04N 1/387 | (2006.01) |
| G01J 3/02 | (2006.01) |

(52) U.S. Cl.
CPC ......... *H04N 1/6008* (2013.01); *G02B 5/3083* (2013.01); *G02B 27/286* (2013.01); *H04N 5/2353* (2013.01); *H04N 5/265* (2013.01); *H04N 9/045* (2013.01); *G01J 3/0224* (2013.01); *G01J 3/50* (2013.01); *H04N 1/3871* (2013.01); *H04N 1/60* (2013.01)

(58) Field of Classification Search
CPC ...... H04N 1/6008; H04N 5/265; H04N 9/045; G02B 5/3083; G02B 27/286
See application file for complete search history.

(56) References Cited

U.S. PATENT DOCUMENTS

| | | | | |
|---|---|---|---|---|
| 5,521,705 | A * | 5/1996 | Oldenbourg | G01J 4/04 356/368 |
| 9,064,763 | B2 | 6/2015 | Ozawa et al. | |
| 2009/0079982 | A1* | 3/2009 | Lefaudeux | G01J 4/04 356/364 |
| 2009/0290039 | A1* | 11/2009 | Kanamori | H04N 9/045 348/222.1 |

(Continued)

FOREIGN PATENT DOCUMENTS

| | | |
|---|---|---|
| JP | H1141514 A | 2/1999 |
| JP | 3727758 B2 | 12/2005 |

(Continued)

*Primary Examiner* — Nhan T Tran
(74) *Attorney, Agent, or Firm* — Rossi, Kimms & McDowell LLP

(57) ABSTRACT

An image processing apparatus includes a corrector configured to provide a color correction based on a reference image selected from a plurality of color images having different polarization states acquired by changing a retardation provided to light from an object, for a synthesized image generated with polarization information of the object obtained from the plurality of color images.

13 Claims, 8 Drawing Sheets

(56) References Cited

U.S. PATENT DOCUMENTS

| | | | |
|---|---|---|---|
| 2010/0321476 A1* | 12/2010 | Martinez | H04N 13/0217 348/49 |
| 2011/0115942 A1* | 5/2011 | Kurita | H04N 5/2355 348/223.1 |
| 2016/0103062 A1* | 4/2016 | Shribak | G02B 21/0092 356/365 |

FOREIGN PATENT DOCUMENTS

| | | | | |
|---|---|---|---|---|
| JP | 2013098928 A | | 5/2013 | |
| JP | 2014183516 A | * | 9/2014 | ............ H04N 5/238 |
| JP | 5682437 B2 | | 3/2015 | |

* cited by examiner

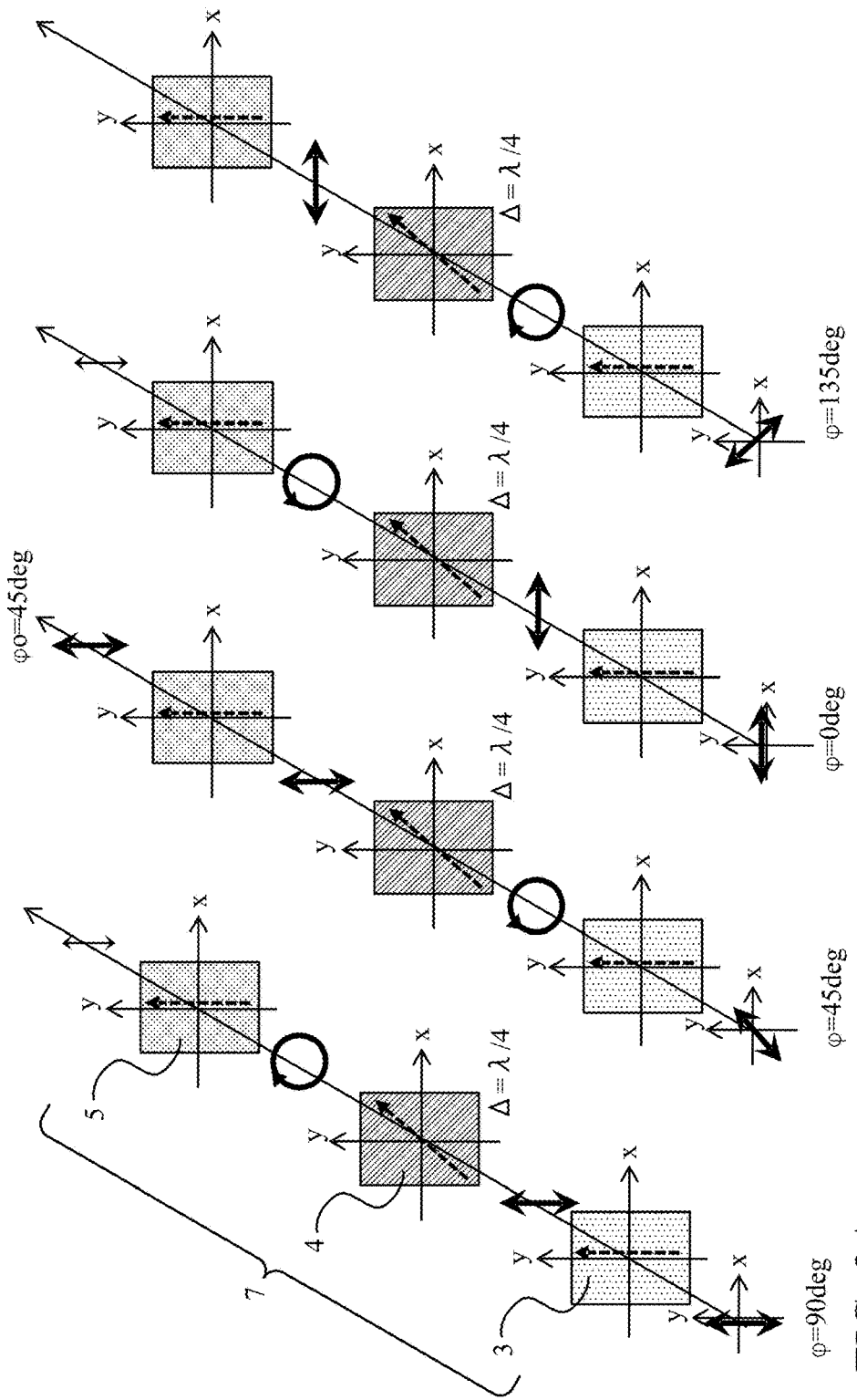

IMAGE PROCESSING APPARATUS, IMAGE PICKUP APPARATUS, AND IMAGE PROCESSING METHOD

BACKGROUND OF THE INVENTION

Field of the Invention

The present invention relates to an image processing apparatus, an image pickup apparatus, and an image processing method.

Description of the Related Art

There is known an image pickup apparatus configured to emphasize and detect a predetermined characteristic of an object by observing a polarization state of light from the object. For example, when images are captured by changing a transmitting polarization direction with a single-lens reflex camera in which a polarization filter is attached to its lens front surface, a highlighting effect of a texture, such as a color and contrast of an object, and a highlighting or reducing effect of an image of reflected light of a water surface etc. can be obtained. Japanese Patent No. 3,727,758 discloses a method for removing a mirror reflection component utilizing polarization information. Japanese Patent No. 5,682,437 discloses a configuration of an image pickup element that includes a wire grid polarizer that transmits different polarized light for each pixel on a solid-state image pickup element and extracts polarization information from a plurality of pixels. U.S. Patent Application Publication No. 2009/0079982 discloses a configuration that includes a quarter waveplate, two retardation plates having a variable retardation, and a polarizer, and obtains part of a Stokes parameter by changing an axial direction of each retardation plate and by generating a plurality of images.

However, Japanese Patent No. 3,727,758 needs dedicated illumination and thus limits the object and the image capturing condition. Japanese Patent No. 5,682,437 requires a plurality of pixels to obtain the polarization information, and the resolution and the color information are lost. U.S. Patent Application Publication No. 2009/0079982 expensively needs two variable retardation plates and a complicated control.

SUMMARY OF THE INVENTION

The sent invention provides an image processing apparatus, an image pickup apparatus, and an image processing method, which can generate a desired image with a simple structure.

An image processing apparatus according to one aspect of the invention includes a corrector configured to provide a color correction based on a reference image selected from a plurality of color images having different polarization states acquired by changing a retardation provided to light from an object, for a synthesized image generated with polarization information of the object obtained from the plurality of color images.

Further features of the present invention will become apparent from the following description of exemplary embodiments with reference to the attached drawings.

BRIEF DESCRIPTION OF THE DRAWINGS

FIGS. 2A to 2D illustrate transmittance dependencies of a polarization modulator to a polarization direction of incident light.

DESCRIPTION OF THE EMBODIMENTS

Figure 1A:
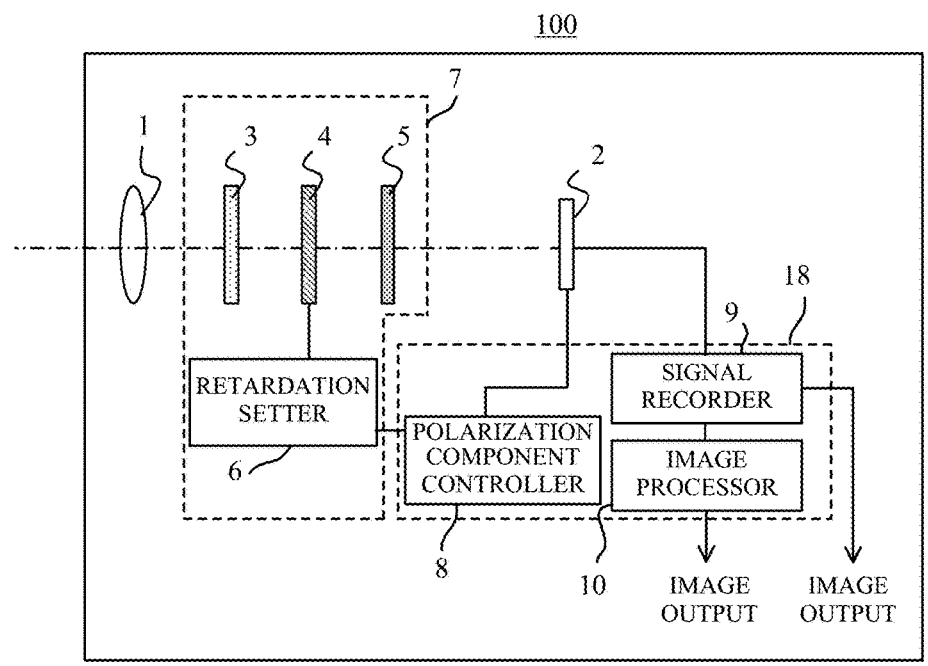
FIGS. 1A to 1C are configuration diagrams of an image pickup apparatus according to a first embodiment.

Referring now to the accompanying drawings, a detailed description will be given of embodiments of the present invention. Those elements in each figure, which are corresponding elements, will be designated by the same reference numerals, and a description thereof will be omitted.

First Embodiment

Figures 1B, 1C:
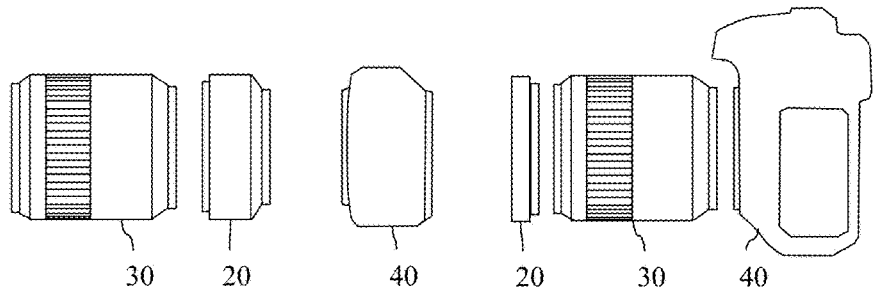

Referring to FIG. 1, a description will be given of a configuration an image pickup apparatus 100 according to this embodiment. FIG. 1A is a schematic diagram of a simplified configuration of the image pickup apparatus 100 according to this embodiment. An alternate long and short dash line in FIG. 1A represents an optical axis. The image pickup apparatus 100 includes an optical system 1, an image pickup element 2, a polarization modulator 7, and a control unit (controller) 18. The optical system 1 images light from the object on the image pickup element 2. The image pickup element 2 has a color filter on each pixel, and obtains two or more color images having different polarization states (polarization directions). This embodiment disposes the polarization modulator 7 on the optical path between the optical system 1 and the image pickup element 2, but the present invention is not limited to this embodiment. As long as the polarization modulator 7 may be disposed on the light incident side (object side) of the image pickup element 2, the polarization modulator 7 may be disposed on the light incident side of the optical system 1 or among a plurality of optical elements included in the optical system 1. The polarization modulator 7 is disposed in the image pickup apparatus 100 in this embodiment but may be configured as an adapter 20 as an optical apparatus separate from the image pickup apparatus 100, as illustrated in FIGS. 1B and 1C. The adapter 20 is attached to the lens unit or the digital camera having common mounts, and used for the lens 30 and the digital camera 40 at positions illustrated in FIGS. 1B and 1C when the polarization information is obtained.

The polarization modulator 7 includes, in order from the light incident side, a quarter waveplate (first retardation plate) 3, a variable retardation plate (second retardation plate) 4, a polarizer 5, and a retardation setter 6. Axes of the quarter waveplate 3, the variable retardation plate 4, and the polarizer 5 are arranged on a plane (xy plane) perpendicular to the optical axis of the optical system 1. The quarter waveplate 3 includes an extension film and provides a relative retardation (or relative phase difference) of π/2 (rad) between the polarization components orthogonal to the incident light. The relative retardation of π/2 provided by the quarter waveplate 3 is unchangeable or fixed. This embodiment uses the quarter plate, but a third-quarter plate or a variable retardation plate may be used as long as it can provide a relative retardation of π/2. The variable phase plate 4 is an element using liquid crystal, and provides a relative retardation similar to that of the quarter waveplate 3 that provides a relative retardation (referred to as a "retardation of the variable retardation plate 4" hereinafter) between the polarization components orthogonal to the incident light which can be modulated according to the applied voltage. The retardation of the variable retardation plate 4 is variable according to the applied voltage. Thus, the retardation of the variable retardation plate 4 can be more quickly changed than a case where a plurality of retardation plates are changed or where the polarizer is rotated. The polarizer 5 transmits a component of the transmission axis direction (transmission polarization direction) among the polarization components of the incident light. Since the polarization modulator 7 is used for the image pickup apparatus 100, the polarizer 5 may use a polarizer of absorbing unnecessary light. When the polarizer 5 uses a type of reflecting the unnecessary light, such as a wire grid polarizer, it reflects the polarized light to be cut and the reflected light becomes stray light and ghost, negatively affecting the image. Thus, the reflection type is unsuitable for the configuration of the image pickup apparatus 100. In order to reduce the influence of the ghost, the polarizer 5 may characteristically absorb 50% or more of the polarized light that oscillates in the direction orthogonal to the transmission axis. This polarizer may include, for example, a film made by extending a resin material containing an iodic compound, but the present invention is not limited to this example and an arbitrary absorption type polarizer may be used. A working wavelength range is a wavelength range in which the image pickup apparatus 100 works, and can be selected by the wavelength characteristic of the image pickup element 2 and application. This embodiment sets the working wavelength range to a visible range (400 nm to 700 nm). The working wavelength range may be at least one of the visible range (400 nm to 700 nm), the near-infrared range (700 nm to 1100 nm), and the near-ultraviolet range (200 nm to 400 nm) based on the configuration of the image pickup apparatus 100. A designed wavelength λ (nm) of the variable retardation plate 4 may be selected according to the working wavelength range obtained by the image pickup apparatus 100 so as to maintain the proper characteristic. The retardation setter 6 sets (changes) the retardation of the variable retardation plate 4 according to the signal (command) from the image pickup apparatus 100. This embodiment provides the retardation setter 6 in the polarization modulator 7, but may provide it in the image pickup apparatus 100 separate from the polarization modulator 7.

The control unit (control apparatus) 18 is a microcomputer, etc., and controls image capturing by the image pickup apparatus 100. The control unit 18 includes a polarization component controller 8, a signal recorder 9, and an image processor (image processing apparatus) 10. The image pickup apparatus 100 fixes the transmission axis direction of the polarizer 5, temporally changes the retardation of the variable retardation plate 4, and captures a plurality of images having different polarization states. The control unit 18 obtains the polarization information of the object based on the plurality of captured images. The polarization component controller 8 outputs a control signal for the retardation of the variable retardation plate 4 to the retardation setter 6 in synchronization with the image pickup element 2. This control changes the polarization component of light from the object which the image pickup element 2 receives, and can acquire an image having the polarization information of the object. The signal recorder 9 temporarily stores a color image acquired from the image pickup element 2 in an unillustrated recording medium, such as a RAM. Each stored image has different polarization information, but a plurality of images may be output without receiving calculation processing, such as image processing. An image acquired in a state where the retardation of the variable retardation plate 4 is large may have coloring (a false color) that is unseen in the original object. Thus, the images may be output as they are when these images are acquired in a state where the retardation of the variable retardation plate 4 is small. The image processor 10 outputs one or more images by performing predetermined processing for the color image acquired from the image pickup element 2.

Referring now to FIGS. 2A to 2D, a description will be given of a behavior of incident light entering the polarization modulator 7 with a fixed transmitting axis direction of the polarizer 5 and the retardation of the variable retardation plate 4 that is set to be constant. FIGS. 2A to 2D illustrate transmittance dependencies of the polarization modulator 7 for the polarization direction of the incident light. FIGS. 2A to 2D set the retardation of the variable retardation plate 4 to λ/4. The arrow direction and length before and after the transmission of the polarization modulator 7 represent the polarization azimuth and intensity, respectively. This embodiment ignores the surface reflection and absorption loss etc. on each element, and considers only the influence of the change of the polarization state. A broken-line arrow on each of the quarter wavelength 3 and the variable retardation plate 4 represents the slow axis direction, and a broken-line arrow on the polarizer 5 represents the transmitting axis direction. In other words, each of the slow axis direction of the quarter wavelength 3 and the transmitting axis direction of the polarizer 5 is parallel to the y-axis direction. However, they may not be strictly parallel to the y-axis direction and can be considered substantially parallel (almost parallel) even if they shift from the y-axis direction by several degrees. Each of the slow axis direction of the quarter wavelength 3 and the transmitting axis direction of the polarizer 5 relative to the x-axis direction forms an azimuth angle φ (degrees) of 90 degrees. However, it may not be strictly 90 degrees and considered substantially or almost 90 degrees even if the azimuth angle shifts by several degrees. The azimuth angle φ of the slow axis direction of the variable retardation plate 4 relative to the x-axis is 45 degrees. However, it may not be strictly 45 degrees and considered to be substantially 45 degrees (almost 45 degrees) even if the azimuth angle shifts by several degrees. The fast axis direction of the quarter plate 3 and the transmitting axis direction of the polarizer 5 may be parallel to the y-axis direction. In this case, the azimuth angle φ of the fast axis direction of the variable retardation plate 4 relative to the x-axis direction is 45 degrees.

FIG. 2A illustrates an incident polarization component with an azimuth angle φ of 90°. The incident light transmits through the quarter waveplate 3 without being affected by the phase change, since the polarization direction is parallel to the slow axis direction of the quarter waveplate 3. The light that has transmitted through the quarter waveplate 3 is converted into rightward circularly polarized light by the variable retardation plate 4, and becomes linearly polarized light having an intensity of about 50% of the incident light after transmitting through the polarizer 5.

FIG. 2B illustrates an incident polarization component with an azimuth angle φ of 45 degrees. The incident light is converted into leftward circularly polarized light by the variable retardation plate 4. The light that has transmitted through the quarter waveplate 3 is converted into linearly polarized light having an azimuth angle φ of 90 degrees in the polarization direction by the variable retardation plate 4 and parallel to the transmitting axis direction of the polarizer 5. Thus, the resultant light transmits through the polarizer 5 with few losses.

FIG. 2C illustrates an incident polarization component with an azimuth angle φ of 0 degrees. The incident light transmits through the quarter waveplate 3 without being affected by the phase change, since the polarization direction is orthogonal to the slow axis direction of the quarter waveplate 3. The light that has transmitted through the quarter waveplate 3 is converted into leftward circularly polarized light by the variable retardation plate 4, and becomes linearly polarized light having an intensity of about 50% of the incident light after transmitting through the polarizer 5.

FIG. 2D illustrates an incident polarization component with an azimuth angle φ of 135 degrees. The incident light is converted into rightward circularly polarized light by the quarter waveplate 3. The light that has transmitted the quarter waveplate 3 is converted into linearly polarized light having an azimuth angle φ of 0 degrees in the polarization direction by the variable retardation plate 4 and orthogonal to the transmitting axis direction of the polarizer 5. Thus, the resultant light rarely transmits through the polarizer 5.

When the retardation of the variable retardation plate 4 is λ/4, the transmittance of the polarization component with the azimuth angle φ of 45 degrees becomes maximum in the polarization component of the incident light on the polarization modulator 7. Hereinafter, φ$_o$ (degree) is an angle (maximum transmission angle) of the polarization component relative to the x-axis direction, which provides the maximum transmittance in the polarization component of the incident light on the polarization modulator 7.

Figure 3:
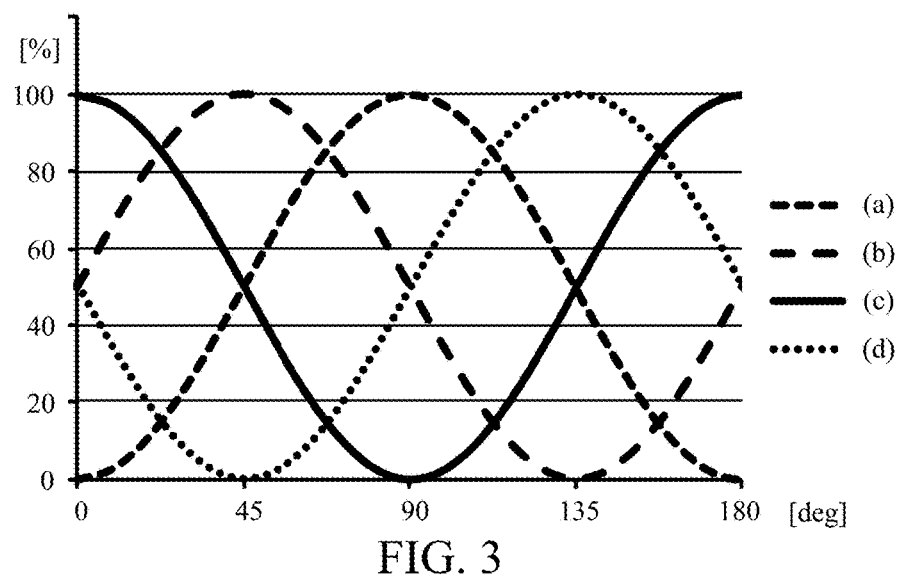
FIG. 3 illustrates a transmittance dependency of a polarization modulator to a polarization direction of the incident light for each retardation of a variable retardation plate.

FIG. 3 illustrates a relationship between the azimuth angle φ of the polarization component of the incident light and the transmittance T(φ) of the polarization modulator 7 for each retardation of the variable retardation plate 4. The influence of the change of the polarization state is considered for the transmitting light intensity, while the surface reflection and the absorption loss etc. on each element are ignored. Lines (a) to (d) in FIG. 3 represent the retardations of 0, λ/4, λ/2, and 3λ/4 set to the variable retardation plate 4. For example, in the line (a), the transmittance T(φ) is 100% when the azimuth angle φ is 90 degrees, and the maximum transmission angle φ$_o$ is 90 degrees. Similarly, in the lines (b), (c), and (d), the maximum transmission angles φ$_o$ are 45 degrees, 0 degrees, and 135 degrees (−45 degrees). As discussed, the maximum transmission angle φ$_o$ and the retardation Δψ (degree) of the variable retardation plate 4 are expressed as follows:

$$\varphi_0 = 90 - \Delta\psi/2 \qquad (1)$$

The transmitting polarization direction can be controlled by controlling the retardation of the variable retardation plate 4 based on the expression (1).

Figure 4:
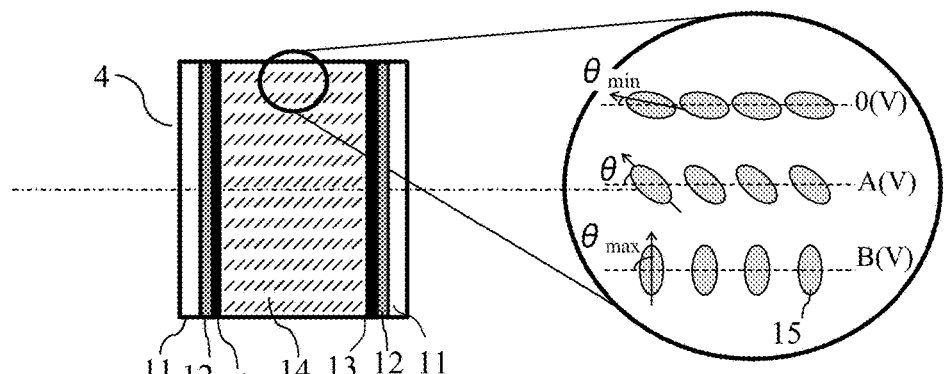
FIG. 4 is a configuration diagram of the variable retardation plate.

Referring now to FIG. 4, a description will be given of a configuration of the variable retardation plate 4. FIG. 4 is a configuration diagram of the variable retardation plate 4, and a circle in FIG. 4 enlarges the liquid crystal layer. The variable retardation plate 4 includes substrates 11, electrode layers 12, alignment films 13, and a liquid crystal layer 14 held by the substrates 11, the electrode layers 12, and the alignment films 13. The liquid crystal layer 14 is a VA type liquid crystal layer (VA liquid crystal layer), and liquid crystal molecules 15 follow the alignment film 13. When the applied voltage is changed in order from 0 [V] to A [V] and B (>A) [V], the tilt angle of the liquid crystal molecule 15 changes from a minimum value θ$_{min}$ to a maximum value θ$_{max}$ through an intermediate value θ. The retardation setter 6 applies the voltage to the variable retardation plate 4, controls the tilt angle θ of the liquid crystal molecule 15 or the refractive index anisotropy, and changes the retardation of the variable retardation plate 4.

Assume that a maximum retardation Δ$_{max}$ (degree) is a retardation when the tilt angle is θ$_{max}$ (degree) and a minimum retardation Δ$_{min}$ (degree) is a retardation when the tilt angle is θ$_{min}$ (degree). Then, the phase change amount is expressed by a difference between the maximum retardation Δ$_{max}$ and the minimum retardation Δ$_{min}$. In this embodiment, the maximum retardation Δ$_{max}$ and the minimum retardation Δ$_{min}$ are 360 degrees and 20 degrees. The retardation of the variable retardation plate 4 is variable in a range from the minimum retardation Δ$_{min}$ to the maximum retardation Δ$_{max}$ both inclusive but may contain at least one of the maximum retardation and the minimum retardation. In addition, the retardation of the variable retardation plate 4 may contain both the minimum retardation Δ$_{min}$ and the maximum retardation Δ$_{max}$. This is because the driving control characteristic when the retardation of the variable retardation plate 4 is set to the minimum retardation Δ$_{min}$ or the maximum retardation Δ$_{max}$ is superior to that when the retardation of the variable retardation plate 4 is set to a retardation having an intermediate value (intermediate retardation). In addition, the retardation caused by the incident angle when the retardation of the variable retardation plate 4 is set to the minimum retardation Δ$_{min}$ or the maximum retardation Δ$_{max}$ changes by an amount smaller than that when the retardation of the variable retardation plate 4 is set to the intermediate retardation. The minimum retardation Δ$_{min}$ is not 0 degrees in this embodiment because the liquid crystal has a pre-tilt angle. However, the present invention is not limited to this embodiment and the minimum retardation Δ$_{min}$ may be 0 degrees. In that case, for example, a retardation plate configured to compensate the pre-tilt angle of the liquid crystal may be provided in front of the variable retardation plate 4. This embodiment may use, but is not limited to, the VA liquid crystal. For example, the present invention can use a variety liquid crystals, such as the TN liquid crystal and the OCB liquid crystal.

Figure 5:
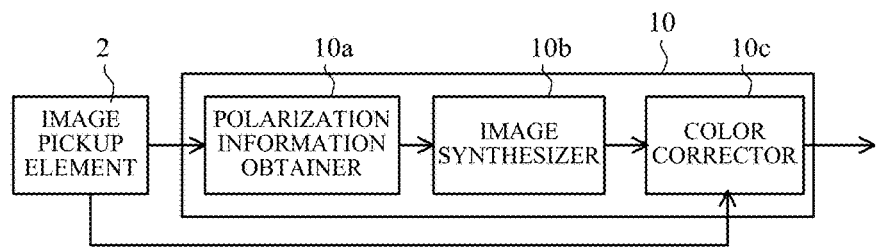
FIG. 5 is a block diagram of an image processing apparatus.

FIG. 5 is a block diagram of the image processor 10. The image processor 10 includes a polarization information obtainer 10a, an image synthesizer 10b, and a color corrector 10c. The image processor 10 executes image processing in accordance with an image processing program as a computer program that runs with software or hardware. The image processor 10 executes the image processing in this embodiment, but an image processing apparatus such as a personal computer (PC) and a dedicated apparatus may execute the image processing. A circuit corresponding to the image processing program may be provided and the image processing may be executed by the circuit.

Figure 6:
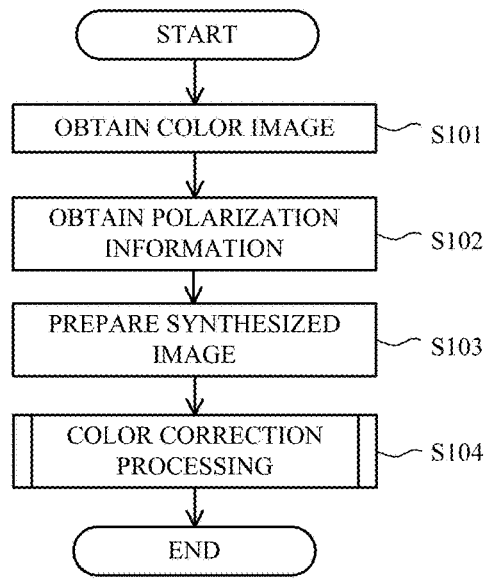
FIG. 6 is a flowchart of image processing.

Referring now to a flowchart of FIG. 6, a description will be given of the image processing executed by the image processor 10. FIG. 6 is a flowchart of the image processing. The flowchart in FIG. 6 can be implemented as an image processing program that enables a computer to execute a function of each step. Each step in FIG. 6 is executed by the image processor 10. Each step in FIG. 6 may be executed by the image processing apparatus separate from the image pickup apparatus. The image processing program may be installed in the unillustrated recorder (storage unit) in the image pickup apparatus 100 or an apparatus separate from the image pickup apparatus 100. The image processing program may be stored, for example, in a non-transitory computer-readable storage medium.

In the step S101, the image processor 10 obtains a plurality of color images (captured images) having different polarization states (polarization directions) captured by the image pickup element 2 with different retardations of the variable retardation plate 4.

Figure 7:
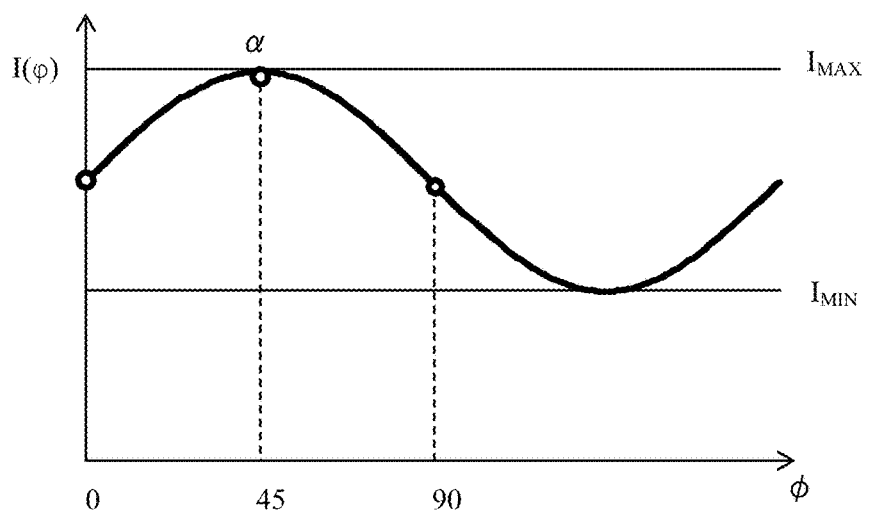
FIG. 7 illustrates a relationship between an azimuth angle and a luminance value.

In the step S102, the polarization information obtainer 10a obtains polarization information of the captured image based on the plurality of colored images obtained by the image pickup element 2. Referring now to FIG. 7, a polarization information acquiring method will be described. FIG. 7 illustrates an illustrative relationship between the azimuth angle φ and the luminance value (light intensity) I(φ). Circles in FIG. 7 represent the luminance values I(0), I(45), and I(90) of the predetermined pixel in the captured images having the polarization directions of 0 degrees, 45 degrees, and 90 degrees. In addition, a solid-line curve indicates a change of the luminance value I(φ) to the azimuth angle φ calculated by fitting based on the three measured values. Assume that $I_{MAX}$ is the maximum luminance value and $I_{MIN}$ is the minimum luminance value in the calculated luminance values I, and α (degree) is an azimuth angle (maximum azimuth angle) corresponding to the maximum luminance value $I_{MAX}$. Then, the luminance value I(φ) to the azimuth angle φ is expressed as follows.

$$I(\varphi)=(I_{MAX}-I_{MIN})\cdot\cos^2(\varphi-\alpha)+I_{MIN} \quad (2)$$

Thus, the polarization information (maximum luminance value $I_{MAX}$, the minimum luminance value $I_{MIN}$, and the maximum azimuth angle α) are calculated for each pixel by measuring these three luminance values, and a change of the luminance value I(φ) to the azimuth angle φ can be calculated. While the polarization information obtainer 10a obtains the polarization information based on the luminance values of the three captured images in this embodiment, the present invention is not limited to this embodiment. The polarization information may be calculated by fitting the luminance values of four or more captured images with the expression (2). In that case, for example, the least squares method etc. can be used.

In the step S103, the image synthesizer 10b generates a synthesized image using the polarization information, such as the maximum luminance value $I_{MAX}$, the minimum luminance value $I_{MIN}$, and the maximum azimuth angle α, acquired by the polarization information obtainer 10a. For example, the image synthesizer 10b can generate a synthesized image in which a scattering component of the object is highlighted or a synthesized image in which a regular reflection component from the object is highlighted, by generating the synthesized image only with the maximum luminance value $I_{MAX}$ or the minimum luminance value $I_{MIN}$. In addition, the image synthesizer 10b generates the synthesized image by changing the azimuth angle α in the expression (2), and can acquire the image by changing the illumination direction. The image synthesizer 10b can generate an image as intended by the photographer using these combinations. The image synthesizer 10b can generate a synthesized image having different polarization information or highlighted effect for each area as well as generating a synthesized image uniformly on the entire image. For example, when images having different polarization states are synthesized for a main object and a background, such as a sky, the background color can be made uniform or the synthesized image in which each of the background and the main object is highlighted can be generated. Alternatively, the synthesized image suitable for the object can be generated through various processing by utilizing the polarization intensity dependency of the object.

In general, the retardation Δψ (degree) of the retardation plate changes according to the wavelength and the incident angle of the incident light. The maximum transmitting angle $\varphi_o$ also changes in the expression (1) based on the wavelength and the incident angle of the incident light. As a result, coloring occurs due to the wavelength dependency and angular dependency of the maximum transmission angle $\varphi_o$ in the captured image acquired by the polarization modulator 7. As the retardation Δψ increases, the influence of the wavelength and incident angle of the incident light becomes remarkable and the coloring becomes conspicuous in the captured image. Since the wavelength dispersion and the angular characteristic of the retardation Δψ can be previously measured, the maximum transmission angle $\varphi_o$ can be correctly calculated with the expression (1) if the wavelength and the incident angle of the incident light are known when the image is acquired. Since the polarization information can be correctly acquired even when the coloring occurs in the captured image, the synthesized image is not affected by the coloring based on the polarization information.

However, for example, an image of an object with an unknown object distance is captured using one image pickup element and the RGB color filter, the wavelength and the incident angle of the incident light cannot be strictly acquired. As a result, the retardation Δψ in the measurement cannot be correctly calculated. One solution for this problem is to use a representative value of the retardation Δψ in acquiring the maximum transmission angle $\varphi_o$ and the polarization information. For example, the maximum transmission angle $\varphi_o$ may be calculated by setting a wavelength that provides the highest transmittance of the color filter to the central wavelength and by setting the retardation when the incident light perpendicularly enters the image pickup element to a representative value of the retardation Δψ in the measurement. However, when the representative value is used for the retardation Δψ, the calculated polarization information contains an error. When the images are synthesized based on the erroneous polarization information, a part or whole image may contain coloring.

A concrete description will be given of a method for generating a synthesized image with the image synthesizer 10b based on the polarization information acquired by the polarization information obtainer 10a. This description discusses a method for generating a synthesized image based on the luminance values of four captured images acquired with four retardations of 20 degrees, 180 degrees, 270 degrees, and 360 degrees of the variable retardation plate 4.

The image pickup element 2 in this embodiment includes an RGB color filter, and the four luminance values have luminance information of R, G, and B. Thus, the polarization information obtainer 10a calculates maximum transmission angles $\varphi_o(R)$, $\varphi_o(G)$, and $\varphi_o(B)$ corresponding to the luminance information R, G, and B for each retardation of the variable retardation plate 4 based on the expression (1). This embodiment uses as a representative value of the retardation of the variable retardation plate 4 each retardation (Δψ(R), Δψ(G), and Δψ(B)) when the incident light perpendicularly enters the image pickup sensor with the maximum transmittance wavelengths (R=610 nm, G=530 nm, and B=470 nm) of respective color filters.

Figure 8A:
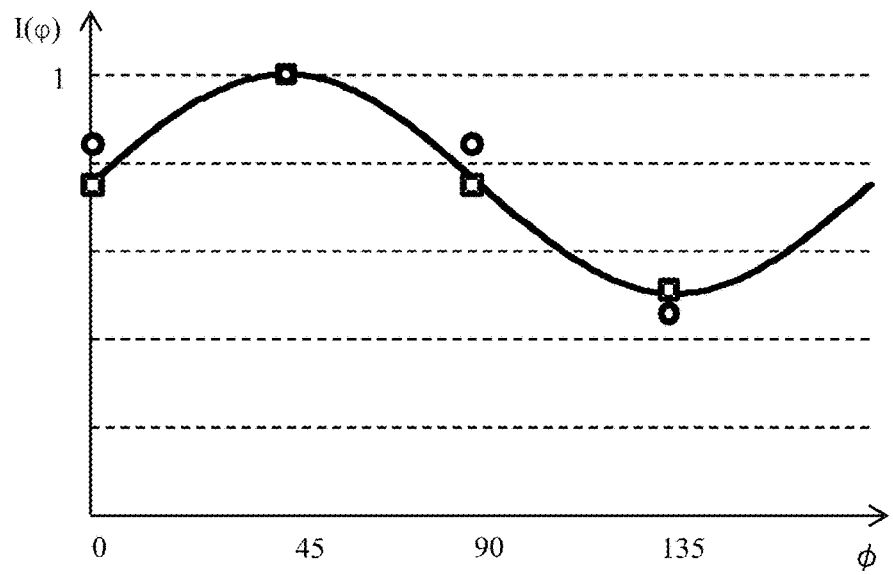
FIGS. 8A and 8B illustrate a relationship between the azimuth angle and the luminance value.
Figure 8B:
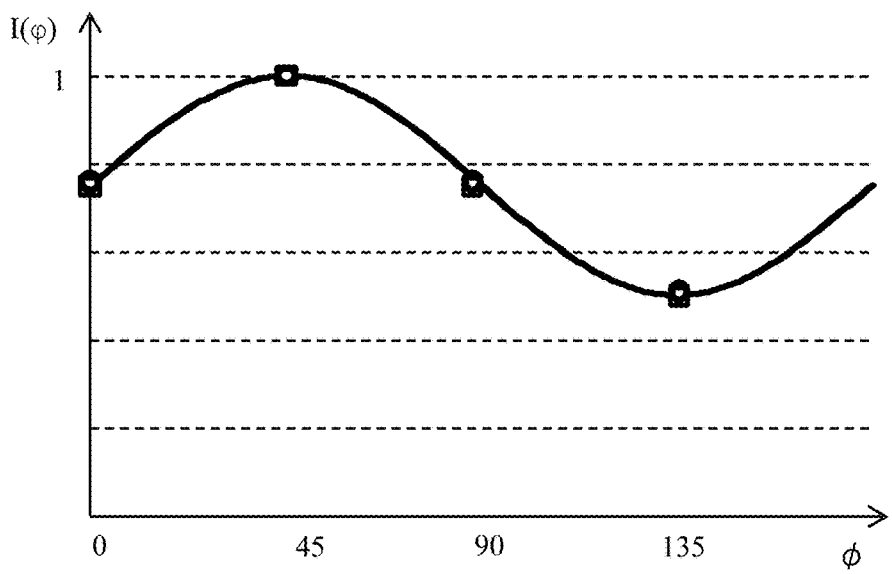
Figure 9D:
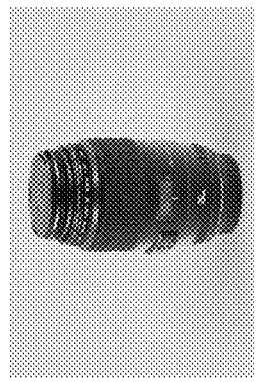
FIGS. 9A to 9D illustrate synthesized images.
Figure 9C:
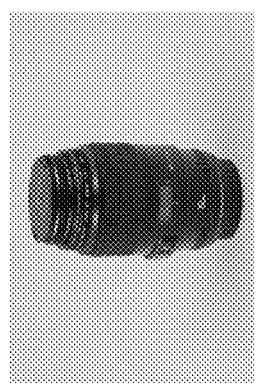
Figure 9B:
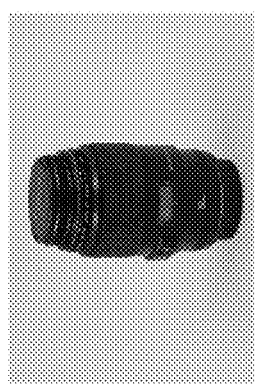
Figure 9A:
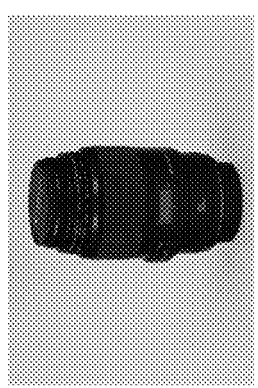
Figure 10A:
FIGS. 10A to 10F illustrate synthesized images.
Figure 10B:
Figure 10C:
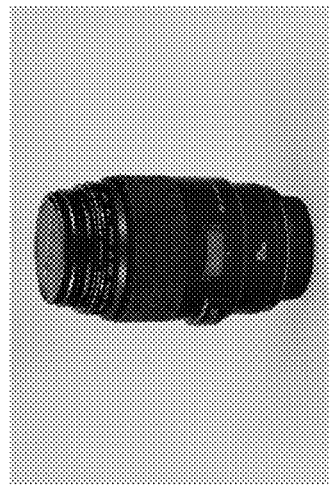
Figure 10D:
Figure 10E:
Figure 10F:

Next, the polarization information obtainer 10a plots the luminance value for each pixel in each image to each maximum transmission angle ($\varphi_o(R)$, $\varphi_o(G)$, and $\varphi_o(B)$) in acquiring the image, and calculates the polarization information for each pixel. FIGS. 8A and 8B are views made by plotting the luminance values in the predetermined pixel to the maximum transmission angle $\varphi_o$. Circles and squares in FIGS. 8A and 8B represent calculated values calculated with the expression (2) using the measured value and the polarization information. FIG. 8A is a view made by using the luminance value of the pixel as it is. FIG. 8B is a view made by using the luminance value of the pixel in which the influence of the transmittance of the polarization modulator 7 is eliminated. As illustrated in FIGS. 8A and 8B, a drop of an extinction ratio in the acquisition course of the polarization information can be partially reduced by considering the influence of the transmittance of the polarization modulator 7.

The image synthesizer 10b generates a synthesized image using the calculated polarization information. FIGS. 9A to 9D illustrate synthesized images made by synthesizing respective pixels where the luminance value I of each pixel is set to $I=I_{MIN}+x(I_{MAX}-I_{MIN})$ (x=0, 0.5, 1.0, and 1.5). FIGS. 10A to 10F illustrate synthesized images by synthesizing respective pixels where the luminance value I of each pixel is set to $I=(I_{MAX}-I_{MIN})\cdot\cos^2(\alpha-\varphi)+I_{MIN}$ ($\varphi$=0 degrees, 30 degrees, 60 degrees, 90 degrees, 120 degrees, and 150 degrees). The synthesized image generated by the image synthesizer 10b is a colored image, but FIGS. 9A to 9D and 10A to 10F converts the synthesized image into a monochromatic image. As illustrated in FIG. 9, the image synthesizer 10b can generate synthesized images having different shined sense on the surface based on the maximum luminance value $I_{MAX}$ and the minimum luminance value $I_{MIN}$ in the polarization information. The image synthesizer 10b can generate a synthesized image in an arbitrary transmitting axis azimuth based on the polarization information (the maximum luminance value $I_{MAX}$, the minimum luminance value $I_{MIN}$, and the maximum azimuth angle $\alpha$), as illustrated in FIGS. 10A to 10F. Although unnatural coloring is not seen in the monochromatic synthesized images in FIGS. 9A to 9D and 10A to 10F, each synthesized image actually partially contains the unnatural coloring.

Accordingly, this embodiment performs color correction processing for the synthesized image in the step S104 through the color corrector 10c in order to eliminate the coloring that would otherwise occur in the synthesized image generated by the image synthesizer 10b. The image processor 10 may include only the color corrector 10c. In that case, the polarization information obtainer 10a and the image synthesizer 10b are separately provided and the image processor 10 corrects colors in the synthesized image output from the other apparatus. In other words, the image processor 10 executes only the color correction processing in this step.

Figure 11:
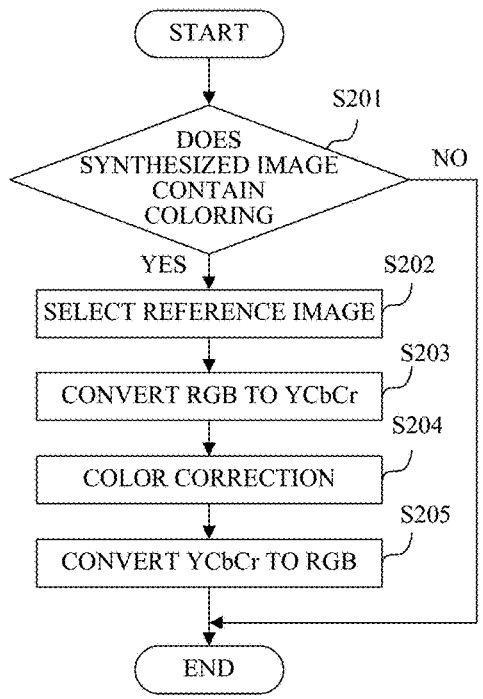
FIG. 11 is a flowchart of color correction processing.

Referring now to FIG. 11, a description will be given of the color correction processing executed by the color corrector 10c so as to eliminate the coloring that would otherwise occur in the synthesized image generated by the image synthesizer 10b. FIG. 11 is a flowchart of the color correction processing. The flowchart in FIG. 11 can be implemented as an image processing program that enables a computer to execute a function of each step. The color corrector 10c executes each step in FIG. 11. Each step in FIG. 11 may be executed by the image processing apparatus separate from the image pickup apparatus. The image processing program may be installed in an unillustrated storage medium (recorder) in the image pickup apparatus 100 or in the apparatus separate from the image pickup apparatus 100. The image processing program may be stored, for example, in a non-transitory computer-readable storage medium.

In the step S201, the color corrector 10c initially determines whether the synthesized image contains coloring. When the coloring occurs, the flow moves to the step S202, and when the coloring does not occur, the process ends. While the color corrector 10c in this step determines whether the synthesized image contains coloring, the photographer may determine the existence of the coloring.

In the step S202, the color corrector 10c selects as the reference image any one of the plurality of captured images acquired by the image pickup element 2. This process corrects coloring in a synthesized image based on the color information of the reference image, and thus the color corrector 10c needs to correctly acquire the color information of the reference image. As described above, as the retardation of the variable retardation plate 4 is larger in acquiring the captured image, coloring in the captured image becomes more conspicuous. In other words, as the retardation of the variable retardation plate 4 becomes smaller in acquiring the captured image, the coloring is less likely to occur in the captured image. Thus, the color corrector 10c may select as the reference image the captured image acquired with a small retardation of the variable retardation plate 4. More specifically, the retardation of the variable retardation plate 4 in acquiring the captured image that is selected as a reference image may be less than $\frac{1}{4}\lambda$ or less than $\frac{1}{8}\lambda$. When the plurality of captured images satisfy this condition, the captured image that minimizes the retardation of the variable retardation plate 4 in acquiring the captured images may be selected as the reference image. The color corrector 10c in this embodiment selects as the reference image the captured image acquired when the retardation of the variable retardation plate 4 is the minimum retardation $\Delta\varphi_{MIN}$ (=20 degrees). The variable retardation plate 4 in this embodiment has a value when the incident light with a wavelength of 550 nm perpendicularly enters the polarization modulator 7. The reference image may be a HDR ("high dynamic range") image in which a plurality of captured images having different exposure conditions are synthesized. Since the HDR image is synthesized from a plurality of images having different exposure conditions, a whiteout and an underexposure in the image are less than those in the normal image and the color information is less likely to be lost. Therefore, when the HDR image is used as the reference image, the color of the synthesized image can be corrected with more color information.

In the step S203, the color corrector 10c converts the synthesized image and the reference image from the RGB signal to the luminance signal and the color difference signal. For example, the color corrector 10c may convert the RGB signal into the YCbCr signal and the HSL signal, and then into the luminance signal and the color difference signal. The color corrector 10c in this embodiment converts the RGB signal into the YCbCr signal, and then into the luminance signal Y and the color difference signals Cb and Cr.

In the step S204, the color corrector 10c corrects the color difference signal of the synthesized image so that the Cb value and the Cr value of the synthesized image accord with the Cb value and the Cr value of the reference signal. The present invention is not limited to this embodiment, and may correct the Cb value and the Cr value of the synthesized image so as to eliminate the coloring in the synthesized image. For example, the color corrector 10c may correct the color difference signal so that the differences between the Cb value and Cr value of the synthesized image and those of the reference image can be smaller than predetermined values. At this time, a common predetermined value may be set to the Cr value and the Cb value, but a suitable predetermined value may be set to each of the Cb value and the Cr value so as to effectively eliminate the coloring in the synthesized image. The predetermined value may use a preset value, but may be set by a user who has confirmed the correction effect in the image so as to effectively eliminate the coloring in the synthesized image.

In the step S205, the color corrector 10c converts the corrected synthesized image into the RGB signal. The color corrector 10c in this embodiment converts the YCbCr signal as the corrected synthesized image into the RGB signal Through the above processing, the present invention can generate a synthesized image in which unnatural coloring is eliminated.

Second Embodiment

This embodiment describes an image pickup apparatus 200 that can handle the negative influence when an optical low-pass filter etc. is arranged. A description of a configuration common to that of the first embodiment will be omitted.

In general, an optical low-pass filter is disposed near the image pickup element so as to prevent moiré and false color in an image pickup apparatus, such as a digital single-lens reflex camera. The polarization information of the object may not be correctly acquired even with the configuration in the first embodiment, if the optical low-pass filter disposed in front of the image pickup element 2 or the autofocus unit depends on the polarization. In addition, when the polarization modulator 7 is simply disposed between the optical low-pass filter and the lens, the optical low-pass filter may not maintain the intended effect due to the influence of the polarization modulator 7.

Figure 12:
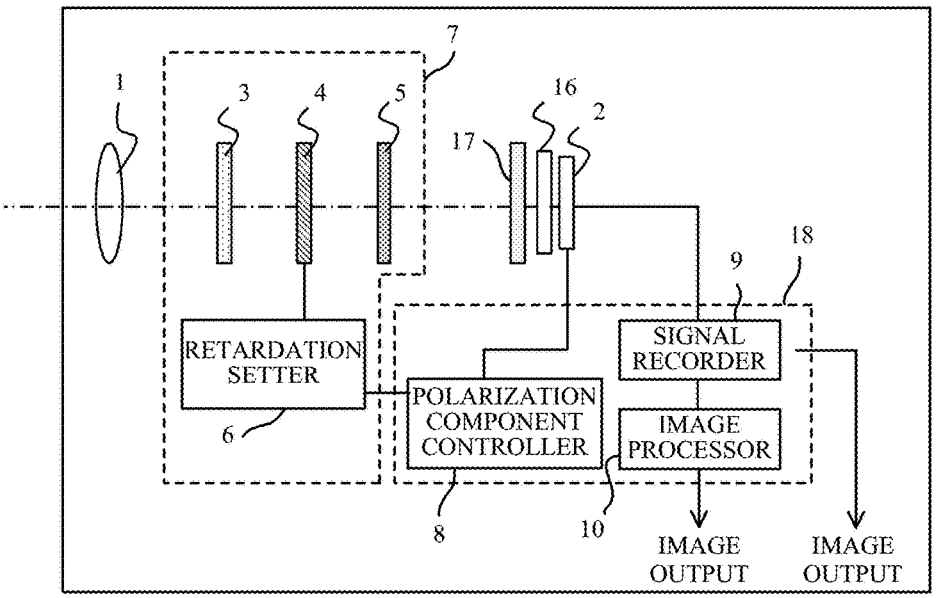
FIG. 12 is a configuration diagram of an image pickup apparatus according to a second embodiment.

FIG. 12 is a schematic diagram of the image pickup apparatus 200 including an optical low-pass filter 17. The optical low-pass filter 17 can use a component using a polarization characteristic, such as a component in which a plurality of layers made of a birefringent medium are laminated and a polarization diffraction element. As a solution for the above problem that occurs when the optical low-pass filter etc. is disposed, the second embodiment insets an achromatic quarter waveplate 16 (achromatic retardation plate) into a space between a polarizer 5 and the optical low-pass filter 17 so as to convert the light into circularly polarized light. Although a usual quarter waveplate may be inserted, the quarter waveplate has a wavelength dispersion and does not provide uniformly circularly polarized light over the working wavelength range. Thus, a phase shift caused by the wavelength may appear as a color change in the image. Thus, a quarter wavelength plate to be inserted may be an achromatic quarter wavelength plate in which a retardation is designed to be minimum in the working wavelength range, such as a visible wavelength range. An alternative measure is to arrange a light separation direction of a layer in the optical low-pass filter 17 closest to the polarization modulator 7 (in case of the lamination structure) and a transmitting axis direction of the polarizer 5 at 45 degrees. Even in this case, the characteristic of the optical low-pass filter and the characteristic of the polarization modulator 7 can be reconciled. The latter measure is simpler although any one of the countermeasures can be used.

Since the working wavelength range of the general image pickup apparatus is almost the visible range (400 to 700 nm), $\lambda$ in the retardation of the variable retardation plate 4 may be a wavelength contained in the visible range, such as a central wavelength of 550 nm. When the working wavelength range for the image pickup apparatus is the infrared range (700 nm to 1100 nm), $\lambda$ may be a wavelength in the infrared range, such as a wavelength of 900 nm. When the working wavelength range for the image pickup apparatus contains both wavelength ranges, $\lambda$ may be a wavelength in the visible or infrared range, such as a wavelength of 750 nm.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079578, filed Apr. 12, 2016, which is hereby incorporated by reference herein in its entirety.

What is claimed is:

1. An image processing apparatus comprising:
a memory storing instructions; and
a processor configured to implement the instructions and execute a plurality of tasks, including:
    a first obtaining task that obtains a plurality of color images having different polarization states acquired by changing a retardation provided to light from an object;
    a second obtaining task that obtains polarized information of the object from the plurality of color images obtained by the first obtaining task;

a synthesizing task that generates a synthesized image using the polarized information obtained by the second obtaining task; and a color correction task that provides a color correction to the synthesized image generated by the synthesizing task to correct for coloring induced to the synthesized image, based on a reference image, which is one of the plurality of color images obtained by the first obtaining task.

2. The image processing apparatus according to claim 1, wherein the color correction task selects, as the reference image, an image acquired when the retardation is minimum.

3. The image processing apparatus according to claim 1, wherein:
the first obtaining task obtains a plurality of images having exposure conditions different from each other; and
the color correction task provides a color correction for the synthesized image based on an image acquired by synthesizing the plurality of images.

4. The image processing apparatus according to claim 1, wherein the color correcting task:
converts signals of the synthesized image and the reference image into a luminance signal and a color difference signal;
corrects the color difference signal of the synthesized image so that a difference between the color difference signal of the synthesized image and the color difference signal of the reference image becomes smaller than a predetermined value; and
corrects the synthesized image based on the corrected difference signal.

5. The image processing apparatus according to claim 4, wherein the color correction task converts the signals of the synthesized image and the reference signal from an RGB signal into an HSL signal or YCbCr signal.

6. An image pickup apparatus comprising:
an image pickup element configured to acquire a plurality of color images having different polarization states; and
an image processing apparatus comprising:
a memory storing instructions; and
a processor configured to implement the instructions and execute a plurality of tasks, including:
a first obtaining task that obtains a plurality of color images having different polarization states acquired by changing a retardation provided to light from an object;
a second obtaining task that obtains polarized information of the object from the plurality of color images obtained by the first obtaining task;
a synthesizing task that generates a synthesized image using the polarized information obtained by the second obtaining task; and
a color correction task that provides a color correction to the synthesized image generated by the synthesizing task to correct for coloring induced to the synthesized image, based on a reference image, which is one of the plurality of color images obtained by the first obtaining task.

7. The image pickup apparatus according to claim 6, further comprising an optical apparatus configured to guide the light from the object to the image pickup element and to change the retardation provided to the light from the object.

8. The image pickup apparatus according to claim 7, wherein:

the optical apparatus includes, in order from the object to the image pickup element:
a first retardation plate configured to provide a relative retardation of $\pi/2$ between a polarization component in a slow axis direction and a polarization component in a fast axis direction;
a second retardation plate configured to change a relative retardation provided between the polarization component of the slow axis direction and the polarization component of the fast axis direction; and
a polarizer configured to extract a polarization component guided to the image pickup element,
the slow axis direction or the fast axis direction of the first retardation plate is approximately parallel to the polarization direction of the retardation plate, and
the slow axis direction of the second retardation plate inclines by about 45 degrees relative to the slow axis direction and the fast axis direction of the first retardation plate.

9. An image processing method comprising:
a first obtaining step of obtaining a plurality of color images having different polarization states acquired by changing a retardation provided to light from an object;
a second obtaining step of obtaining polarized information of the object from the plurality of color images obtained in the first obtaining step;
a synthesizing step of generating a synthesized image using the polarized information obtained in the second obtaining step; and
a color correction step of providing a color correction to the synthesized image generated in the synthesizing step to correct for coloring induced to the synthesized image, based on a reference image, which is one of the plurality of color images obtained in the first obtaining step.

10. The image processing method according to claim 9, wherein the first obtaining step selects, as the reference image, an image acquired when the retardation is minimum.

11. The image processing method according to claim 9, wherein:
the first obtaining step obtains a plurality of images having exposure conditions different from each other, and
the color correction step provides a color correction for the synthesized image based on an image acquired by synthesizing the plurality of images.

12. The image processing method according to claim 9, wherein the color correcting step:
converts signals of the synthesized image and the reference image into a luminance signal and a color difference signal;
corrects the color difference signal of the synthesized image so that a difference between the color difference signal of the synthesized image and the color difference signal of the reference image becomes smaller than a predetermined value; and
corrects the synthesized image based on the corrected difference signal.

13. The image processing method according to claim 12, wherein the color correcting step converts the signals of the synthesized image and the reference signal from an RGB signal into an HSL signal or YCbCr signal.

* * * * *